(12) United States Patent
Anderson et al.

(10) Patent No.: US 8,782,139 B2
(45) Date of Patent: *Jul. 15, 2014

(54) TRANSFERRING APPLICATIONS AND SESSION STATE TO A SECONDARY DEVICE

(75) Inventors: Jason L. Anderson, San Jose, CA (US); Nimesh Bhatia, San Jose, CA (US); Gregory J. Boss, Saginaw, MI (US); Shaun T. Murakami, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 206 days.

This patent is subject to a terminal disclaimer.

(21) Appl. No.: 13/460,609

(22) Filed: Apr. 30, 2012

(65) Prior Publication Data

US 2013/0185383 A1 Jul. 18, 2013

Related U.S. Application Data

(63) Continuation of application No. 13/350,942, filed on Jan. 16, 2012.

(51) Int. Cl.
*G06F 15/16* (2006.01)
*H04N 21/41* (2011.01)
*H04L 29/08* (2006.01)

(52) U.S. Cl.
CPC .......... *H04N 21/4126* (2013.01); *H04L 69/329* (2013.01)
USPC ............................. 709/205; 709/213; 709/217

(58) Field of Classification Search
CPC .................... H04N 21/4126; H04L 69/329
USPC .................... 709/204, 205, 213, 217
See application file for complete search history.

(56) References Cited

U.S. PATENT DOCUMENTS

| 7,181,759 | B2 | 2/2007 | Oz et al. |
| 7,240,099 | B2 | 7/2007 | Miyazaki et al. |
| 7,810,144 | B2 | 10/2010 | Haff et al. |
| 8,224,894 | B1 | 7/2012 | Parks et al. |
| 2002/0059638 | A1 | 5/2002 | Oz et al. |
| 2009/0183151 | A1 | 7/2009 | Gharabally et al. |
| 2009/0276547 | A1 | 11/2009 | Rosenblatt et al. |
| 2011/0163944 | A1 | 7/2011 | Bilbrey et al. |
| 2012/0089906 | A1 | 4/2012 | Reeves et al. |
| 2013/0117558 | A1* | 5/2013 | Metke et al. ............ 713/156 |
| 2013/0147784 | A1* | 6/2013 | Hill ............................ 345/418 |
| 2013/0167242 | A1* | 6/2013 | Paliwal ........................ 726/26 |

OTHER PUBLICATIONS

Mineno et al., "Seamless Streaming Transfer Method Between Devices within Mobile Personal Area Networks," CCNC 2007 Consumer Communications and Networking Conference, 4th IEEE, May 15, 2007, pp. 701-705.
Anderson, et al., "System and Method for Transferring Applications and Session State to a Secondary Device," filed on Jan. 16, 2012, assigned U.S. Appl. No. 13/350,942, 33 pages.
Office Action, dated Jan. 16, 2014, regarding U.S. Appl. No. 13/350,942, 18 pages.

* cited by examiner

*Primary Examiner* — Viet Vu
(74) *Attorney, Agent, or Firm* — Yee & Associates, P.C.; Parashos T. Kalaitzis

(57) ABSTRACT

A first device transfers a running application to a second device. A first device sends a request to transfer a running application to a second device. The second device determines whether the application is presently installed on the second device. The second device determines whether the application is an application designed to run on a platform of the second device. The second device then receives state information for the application from the first device. In response to receiving the state information, the second device executes a counterpart application utilizing the state information received from the first device.

5 Claims, 6 Drawing Sheets

TRANSFERRING APPLICATIONS AND SESSION STATE TO A SECONDARY DEVICE

This application is a continuation of application Ser. No. 13/350,942 filed Jan. 16, 2012, status pending.

BACKGROUND

1. Field

The disclosure relates generally to a computer implemented method, computer program product, and a data processing system. More specifically the disclosure relates to a computer implemented method, computer program product, and a data processing system for transferring running applications between disparate devices.

2. Description of the Related Art

Battery life has been and will always be a fundamental limitation of the battery powered portable computers and mobile devices. Advances in battery cell technology have lengthened the ability of one to computer by battery from merely an hour to nearly a day. Yet, the mobile computing workforce still faces on a constant basis the nearly exhausted charge of the mobile device's battery. To maximize mobile usage of the mobile device, automated power management techniques have evolved that generally include the strategic management of display backlighting, hard drive powering and the reduction in central processing unit (CPU) speed.

Even still, most computing end users can attest to the moment when, despite best efforts at power management, they are notified of the impending exhaustion of battery life—oftentimes at a critical time when computing is of paramount importance. Shut down of the mobile device often leads to the loss of unsaved data and state information for any applications running on the mobile device.

SUMMARY

According to one embodiment of the present invention, a computer implemented method, a data processing system, and a computer program product are provided for transferring an application from a first device to a second device. A first device sends a request to transfer a running application to a second device. The second device determines whether the application is presently installed on the second device. The second device determines whether the application is an application designed to run on a platform of the second device. The second device then receives state information for the application from the first device. In response to receiving the state information, the second device executes a counterpart application utilizing the state information received from the first device.

DETAILED DESCRIPTION

Figure 1:
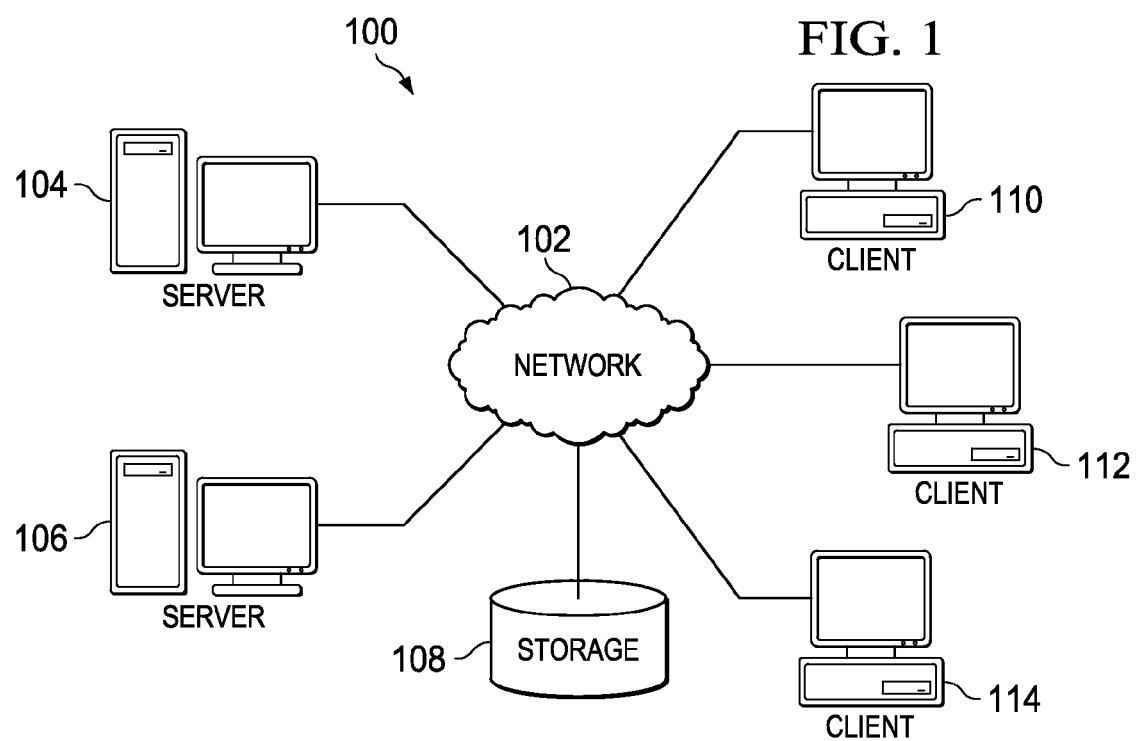
FIG. 1 is an illustrative diagram of a data processing environment is provided in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures and, in particular, with reference to FIG. 1, an illustrative diagram of a data processing environment is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers 110, 112, and 114 connect to network 102. Client computers 110, 112, and 114 may be, for example, personal computers or network computers. In the depicted example, server computer 104 provides information, such as boot files, operating system images, and applications to client computers 110, 112, and 114. Client computers 110, 112, and 114 are clients to server computer 104 in this example. Network data processing system 100 may include additional server computers, client computers, and other devices not shown.

Program code located in network data processing system 100 may be stored on a computer recordable storage medium and downloaded to a data processing system or other device for use. For example, program code may be stored on a computer recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

Thus, illustrative embodiments of the present invention provide a computer implemented method, computer system, and computer program product for transferring an application from a first device to a second device. A first device sends a request to transfer a running application to a second device. The second device determines whether the application is presently installed on the second device. The second device determines whether the application is an application designed to run on a platform of the second device. The second device then receives state information for the application from the first device. In response to receiving the state information, the second device executes a counterpart application utilizing the state information received from the first device.

Figure 2:
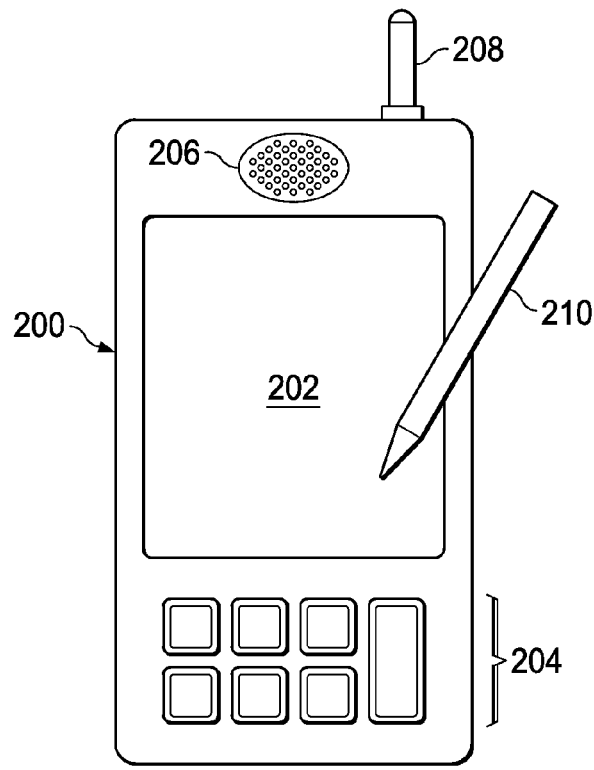
FIG. 2 is a diagram of a client in the form of a mobile device is depicted in accordance with a preferred embodiment of the present invention.

With reference now to FIG. 2, a diagram of a client in the form of a mobile device is depicted in accordance with a preferred embodiment of the present invention. Mobile device 200 includes a display 202 for presenting textual and graphical information. Display 202 may be a known display device, such as a liquid crystal display (LCD) device. The display may be used to present a map or directions, calendar information, a telephone directory, or an electronic mail message. In these examples, screen 202 may receive user input using an input device such as, for example, stylus 210.

Mobile device 200 may also include keypad 204, speaker 206, and antenna 208. Keypad 204 may be used to receive user input in addition to using screen 202. Speaker 206 provides a mechanism for audio output, such as presentation of an audio file. Antenna 208 provides a mechanism used in establishing a wireless communications link between mobile device 200 and a network, such as network 202 in FIG. 2.

Mobile device 200 also preferably includes a graphical user interface that may be implemented by means of systems software residing in computer readable media in operation within mobile device 200.

Figure 3:
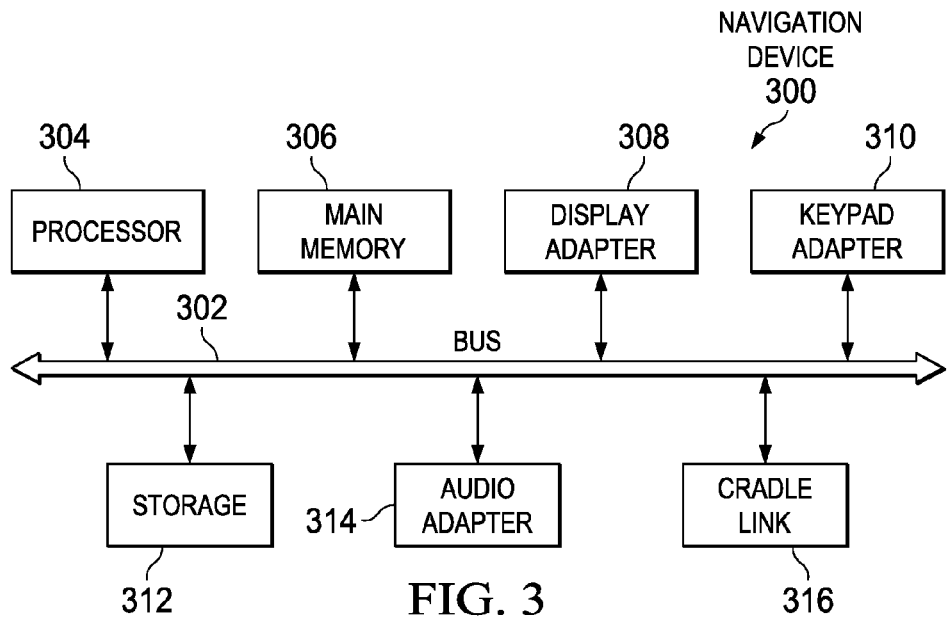
FIG. 3 is a block diagram of a mobile device is shown in accordance with a preferred embodiment of the present invention.

Turning now to FIG. 3, a block diagram of a mobile device is shown in accordance with a preferred embodiment of the present invention. Mobile device 300 is an example of a mobile device, such as mobile device 200 in FIG. 2, in which code or instructions implementing the processes of the present invention may be located. Mobile device 300 includes a bus 302 to which processor 304 and main memory 306 are connected. Display adapter 308, keypad adapter 310, storage 312, and audio adapter 314 also are connected to bus 302. Cradle link 316 provides a mechanism to connect mobile device 300 to a cradle used in synchronizing data in mobile device 300 with another data processing system. Further, display adapter 308 also includes a mechanism to receive user input from a stylus when a touch screen display is employed.

An operating system runs on processor 304 and is used to coordinate and provide control of various components within mobile device 300 in FIG. 3. Instructions for the operating system and applications or programs are located on storage devices, such as storage 312, and may be loaded into main memory 306 for execution by processor 304.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3.

Figure 4:
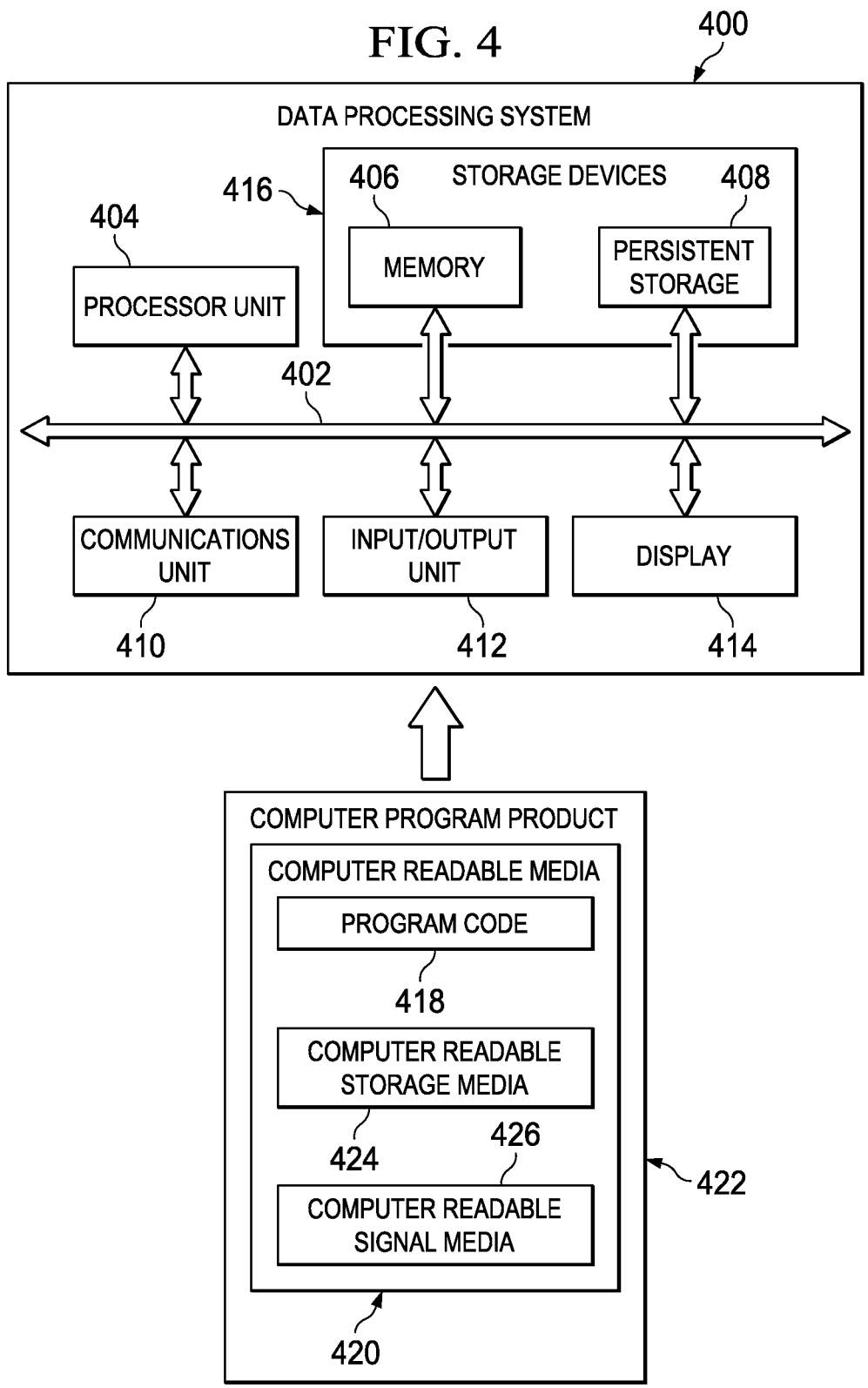
FIG. 4 is an illustration of a data processing system is depicted in accordance with an advantageous embodiment.

Turning now to FIG. 4, an illustration of a data processing system is depicted in accordance with an advantageous embodiment. Data processing system 400 may be used to implement a mobile device, such a mobile device 200 of FIG. 2, or a server computer, such as one of server computer 104 and server computer 106 of FIG. 1. In this illustrative example, data processing system 400 includes communications framework 402, which provides communications between processor unit 404, memory 406, persistent storage 408, communications unit 410, input/output (I/O) unit 412, and display 414. In these examples, communications frame work 402 may be a bus system.

Processor unit 404 serves to execute instructions for software that may be loaded into memory 406. Processor unit 404 may be a number of processors, a multi-processor core, or some other type of processor, depending on the particular implementation. A number, as used herein with reference to an item, means one or more items. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Storage devices 416 may also be referred to as computer readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications framework 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code in the different embodiments may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422 in these examples. In one example, computer readable media 420 may be computer readable storage media 424 or computer readable signal media 426. Computer readable storage media 424 may include, for example, an optical or magnetic disk that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory, that is connected to data processing system 400. In some instances, computer readable storage media 424 may not be removable from data processing system 400. In these examples, computer readable storage media 424 is a physical or tangible storage device used to store program code 418 rather than a medium that propagates or transmits program code 418. Computer readable storage media 424 is also referred to as a computer readable tangible storage device or a computer readable physical storage device. In other words, computer readable storage media 424 is a media that can be touched by a person.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 418 may be downloaded over a network to persistent storage 408 from another device or data processing system through computer readable signal media 426 for use within data processing system 400. For instance, program code stored in a computer readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different advantageous embodiments may be implemented in a data processing system including components in addition to or in place of those illustrated for data processing system 400. Other components shown in FIG. 4 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 418 may be omitted because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

In another example, a bus system may be used to implement communications framework 402 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 406, or a cache, such as found in an interface and memory controller hub that may be present in communications framework 402.

Figure 5:
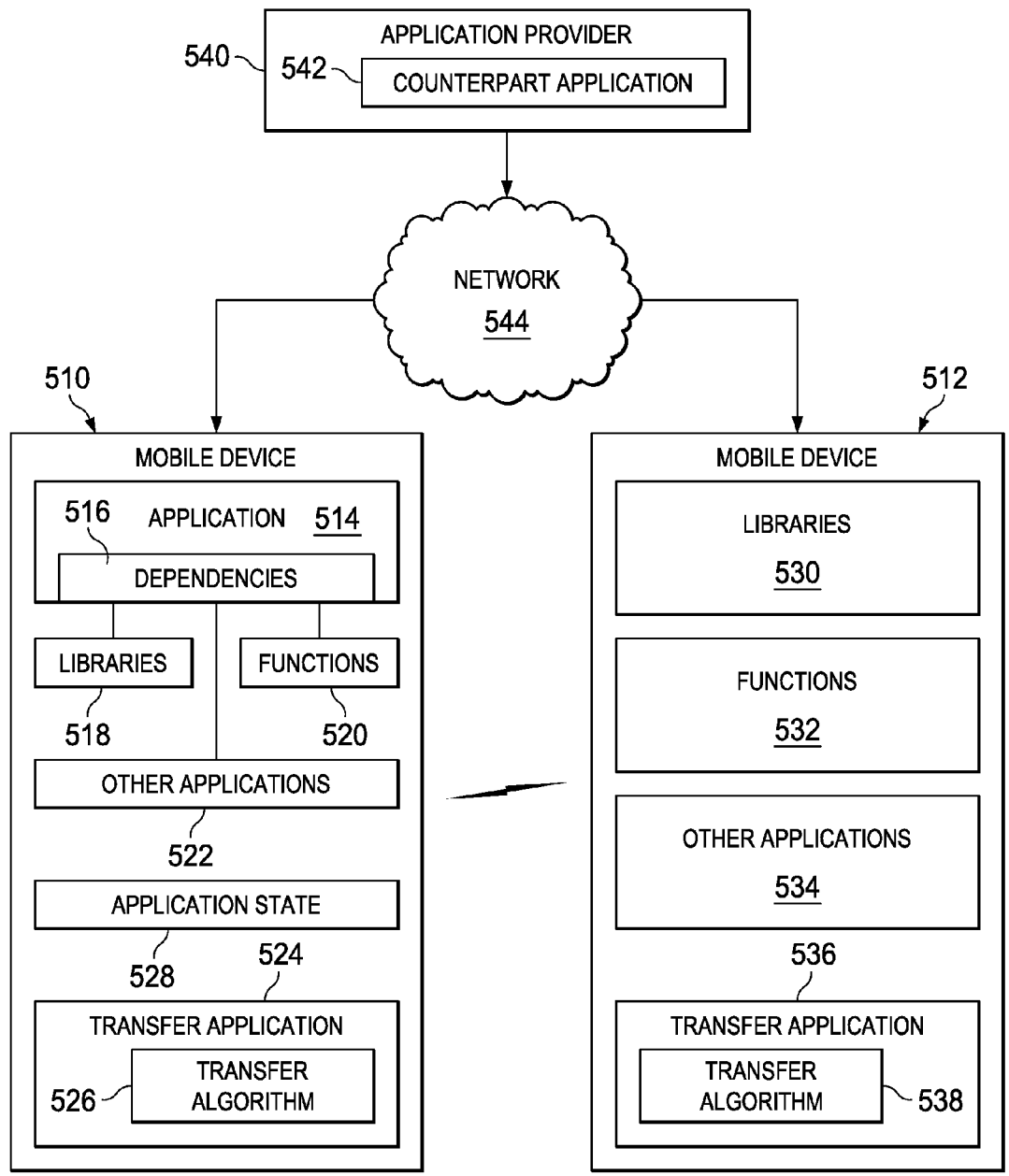
FIG. 5 is a data flow is shown for transferring a running application from one device to another device.

Referring now to FIG. 5, a data flow is shown for transferring a running application from one device to another device. Device 510 and device 512 can be, for example, mobile device 200 of FIG. 2. Alternatively, device 510 and device 512 can also be, but not limited to, for example, a tablet computer, a laptop computer, a desktop computer, and a television.

Device 510 includes application 514. Application 514 is a software application designed to provide a service to a user. Application 514 is contrasted with system software and middleware, which manage and integrate a computer's capabilities, but typically do not directly apply them in the performance of tasks that benefit the user. Application 514 includes dependencies 516. Dependencies 516 are subroutines, methods, variables, code, data structures, and objects that are utilized by application 514. Dependencies 516 can include, for example but not limited to, dependencies on library 518, device functions 520, and other applications 522.

Library 518 is a collection of resources such as pre-written code and subroutines, classes, values and type specifications that provide services to applications, such as application 514 and other applications 522. Device functions 520 are functionality provided by mobile device, such as a global positioning device, a telephone. Other applications 522 are other software applications designed to provide a service to a user.

Device 510 includes transfer application 524. Transfer application 524 is a software application for transferring running applications and receiving running applications, such as application 514 to and from another device, such as device 512.

Transfer application 524 includes transfer algorithm 526. Transfer algorithm 526 is a series of instructions for moving running applications, such as application 514, from device 510 to device 512.

Transfer application 524 allows device 510 to connect to other devices, such as device 512. Device 510 can connect to other devices, for example but not limited to, by using a personal area network connection. Transfer application 524 then enables the transfer of a running application, such as application 514, including any application state for the running application, such as application state 528. Application state 528 is data describing the execution state lifecycle of application 514.

Application 514 is transferred during execution from device 510 to device 512. Transfer application 524 gathers, for example but not limited to, process state data, data regarding open files and open sockets bound to the process, the state of streams associated with the process, the state of files associated with the process, and any other information regarding the current state of application 514 and stores the data as application state 528. Application state 528 is utilized to restart application 512 on device 512 in the same state that application 512 were in on device 510 at the time application state 528 was last saved.

Device 512 includes library 530, device functions 532, and other applications 534. Device 512 includes transfer application 536 having transfer algorithm 538. Each of library 530, device functions 532, other applications 534, and transfer application 536 are similar to library 518, device functions 520, other applications 522, and transfer application 524, respectively.

Device 512 can be a different platform than device 510. That is, device 512 can for example, be a different manufacture, be a different model, and run a different operating system than device 510.

In one embodiment, application 514 is an application designed to run on a different platform than device 512. An application designed to run on a different platform is an application that is intended for use on a different device than device 512. When application 510 is designed to run on a different platform to device 512, transfer application 536 can contact application provider 540 to obtain counterpart application 542.

Application provider 540 is a data processing system, such as one of server computer 104 and server computer 106 of FIG. 1 that makes applications available to devices, such as device 510 and device 512. Application provider 540 provides applications that are executable in a format that is designed to run on a platform on which the application is to be executed. For example, application 514 is compiled in a format that is executable by device 510. Counterpart application 542 may provide an identical service as application 514, but instead be compiled in a format that is designed to run on the platform of device 512. Either one or both of device 510 and device 512 can access application provider 540 over network 544.

Transfer application 536 provides instructions for mapping dependencies 516 of application 514, to subroutines, methods, variables, code, data structures, and objects that are utilized by a counterpart application 542. In one illustrative embodiment, each of transfer application 524 and transfer application 536 provides instructions by creating a dependency map.

Transfer application 524 determines and collects the identity, attributes, and settings of each subroutines, methods, variables, code, data structures, and objects that are utilized by application 514. Similarly, transfer application 524 determines and collects the identity, attributes, and settings of each subroutines, methods, variables, code, data structures, and objects that are utilized by counterpart application 542. This process is iterative. Each identity attributes, and settings discovered can trigger the discovery of other applications and services until the entire infrastructure is discovered. After the identity, attributes, and settings of each subroutines, methods, variables, code, data structures, and objects for each of application 514 and counterpart application 542 are discovered, transfer application 542 can apply a heuristic-based algorithm to correlate the dependencies that it has found. Transfer application 524 uses this analysis to map dependencies 516 to library 530, device functions 532, and other applications 534 upon which counterpart application 542 depends.

When the mapping is completed, application state 528 can be transferred from device 510 to device 512. In one illustrative embodiment, transfer application 524 and transfer application 536 use checkpoints and restart features to move workload partitions.

A checkpoint process is a software component for a given process that gathers process state data, data regarding open files and open sockets bound to the process, and any other information regarding the current state of a process in application 514 and saves it as application state 528. Transfer application 524 then freezes application 514, and sends application state 528 to device 512. Device 512 can then store application state 528 locally, and configures counterpart application 542 to utilize application state 528. Device 512 can then start counterpart application 542.

Figure 6:
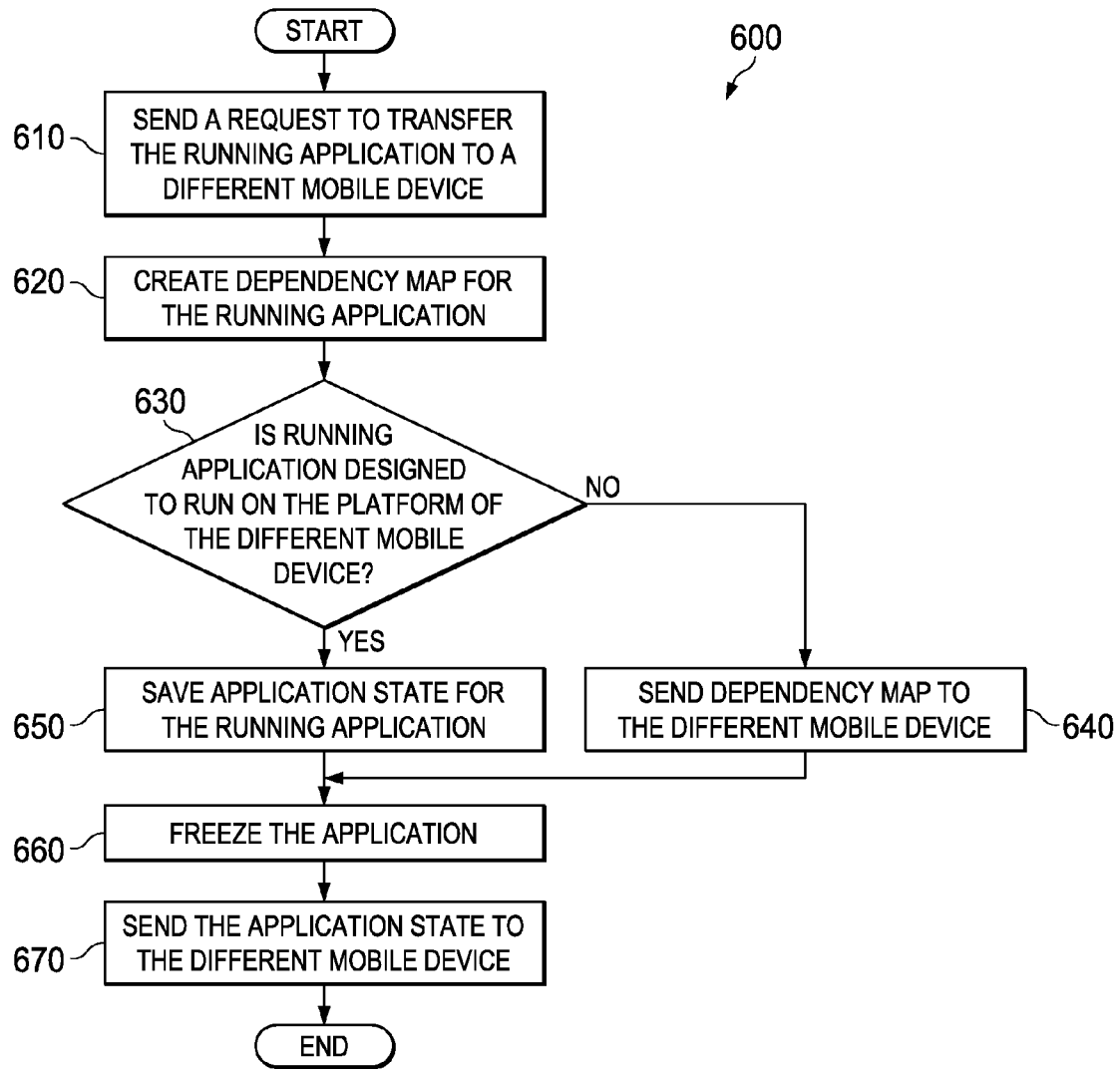
FIG. 6 is a flowchart for sending a running application to a device is shown according to an illustrative embodiment.

Referring now to FIG. 6, a flowchart for sending a running application to a device is shown according to an illustrative embodiment. Process 600 is a software process executing on a software component of a device, such as transfer application 526 of FIG. 5.

Process 600 begins by sending a request to transfer the running application to a different device running a different platform (step 610). The running application can be application 514 of FIG. 5. The different device can be device 524 of FIG. 5.

Process 600 then creates a dependency map for the running application. The dependency map (step 620) is an identity, attributes, and settings of each subroutines, methods, variables, code, data structures, and objects that are utilized by the running application. In one illustrative embodiment, the dependency map is a directed graph.

Process 600 then identifies whether the running application is designed to run on the platform of the different device (step 630). Process 600 can identify that the running application is designed to run on the platform of the different mobile, for example, by receiving a notification from the different device. Responsive to determining that the running application is designed to run on the platform of the different device ("yes" at step 630), process 600 proceeds to step 650.

Responsive to determining that the running application is not designed to run on the platform of the different device ("no" at step 630), process sends the dependency map to the different device (step 640).

Process 600 saves application state for the running application (step 650). The application state can be application state 528 of FIG. 5. The application state can include state data, data regarding open files and open sockets bound to the process, and any other information regarding the current state of a process in a running application, such as application 514 of FIG. 5.

Responsive to saving the application state, process 600 freezes the application (step 660), and sends the application state to the different device running the different platform (step 670). Process 600 terminates thereafter. The different device running the different platform can then utilize the application state to start the counterpart application on the different device running the different platform.

Figure 7:
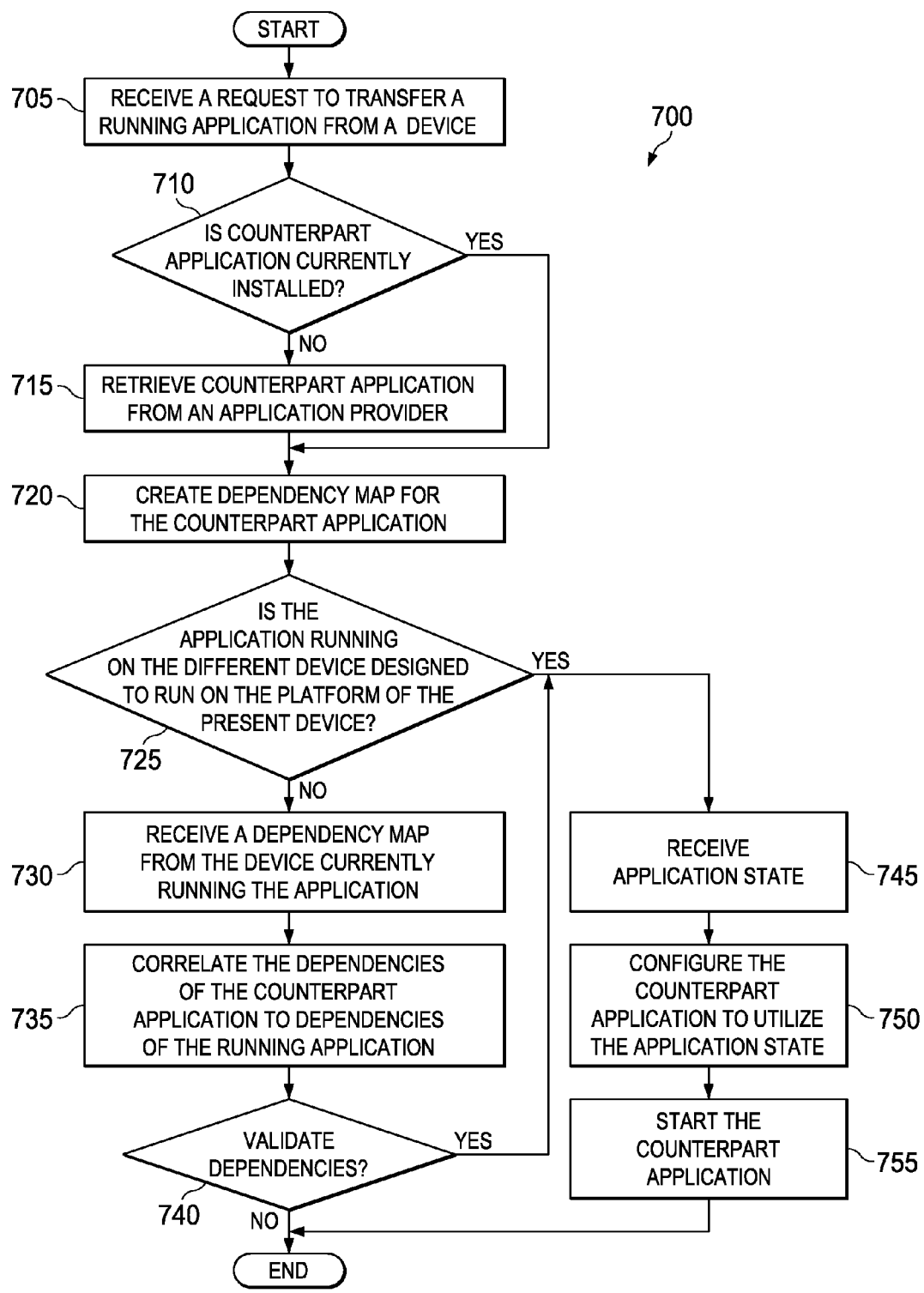
FIG. 7 is a flowchart for receiving a running application from a device running a different platform is shown according to an illustrative embodiment.

Referring now to FIG. 7, a flowchart for receiving a running application from a device running a different platform is shown according to an illustrative embodiment. Process 700 is a software process executing on a software component, such as transfer application 536.

Process 700 begins by receiving a request to transfer a running application from a device (step 705). The device can be device 510 of FIG. 5.

Responsive to receiving the request, process 700 determines if a counterpart application is presently installed (step 710). The counterpart application can be counterpart application 542 of FIG. 5. Responsive to determining that the counterpart application is installed ("yes" at step 710), process 700 proceeds to step 720.

Responsive to determining that the counterpart application is not installed ("no" at step 710), process 700 retrieves the counterpart application from an application provider (step 715). The application provider can be application provider 540 of FIG. 5. Process 700 proceeds to step 720.

Process 700 creates a dependency map for the counterpart application (step 720). The dependency map is an identity, attributes, and settings of each subroutines, methods, variables, code, data structures, and objects that are utilized by the counterpart application. In one illustrative embodiment, the dependency map is a directed graph.

Process 700 then determines whether the application running on the different device is designed to run on the platform of the present device (step 725). Responsive to determining that the application running on the different device is designed to run on the platform of the present device ("yes" at step 725), process 700 proceeds to step 745.

Responsive to determining that the running application is not designed to run on the platform of the present device ("no" at step 725), process 700 receives a dependency map from the device currently running the application (step 730).

The dependency map is an identity, attributes, and settings of each subroutines, methods, variables, code, data structures, and objects that are utilized by the running application. In one illustrative embodiment, the dependency map is a directed graph.

Responsive to receiving the dependency map from the device currently running the application, process 700 correlates the dependencies of the counterpart application to the dependencies of the running application (step 735). Process 700 then proceeds to step 740.

Responsive to correlating the dependencies of the counterpart application to the dependencies of the running application, process 700 determines whether the dependency map is valid (step 740). Validation of the dependency map determines whether the dependencies are supported by the device running the different platform.

Responsive to determining that the dependency map is invalid ("no" at step 740), process 700 terminates. Because the device running the different platform cannot support the dependencies, the device running the different platform cannot run the transferred application.

Returning now to step 740, responsive to determining that the dependency map is valid ("yes" at step 740), process 700 receives the application state (step 745). The application state can be application state 528 of FIG. 5. The application state can include state data, data regarding open files and open sockets bound to the process, and any other information regarding the current state of a process in a running application, such as application 514 of FIG. 5.

Responsive to receiving the application state, process 700 configures the counterpart application to utilize the application state (step 750). Process 700 then starts the counterpart application (step 755), with the process terminating thereafter.

Thus, illustrative embodiments of the present invention provide a computer implemented method, computer system, and computer program product for transferring an application from a first device to a second device. A first device sends a request to transfer a running application to a second device. The second device determines whether the application is presently installed on the second device. The second device determines whether the application is an application designed to run on a platform of the second device. The second device then receives state information for the application from the first device. In response to receiving the state information, the second device executes a counterpart application utilizing the state information received from the first device.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for transferring an application from a first device to a second device, the method comprising:
   receiving, by the second device, a request to transfer an application from the first device to the second device, wherein the application is running on the first device;
   determining, by the second device, whether the application is presently installed on the second device;
   determining, by the second device, whether the application is an application designed to run on a platform of the second device;
   responsive to determining that that the running application is an application designed to run on the platform of the second device, creating a dependency map for the counterpart application;
   receiving a dependency map for the application from the first device; and
   correlating dependencies in the dependency map for the counterpart application to dependencies in the dependency map for the application;
   responsive to correlating dependencies in the dependency map for the counterpart application to dependencies in the dependency map for the application, determining whether the dependency map is valid; and
   responsive to determining that the dependency map is not valid, not transferring the application from the first device to the second device
   responsive to determining that the dependency map is valid, receiving, by the second device, state information for the application from the first device;
   responsive to receiving state information for the application, executing, by the second device, a counterpart application on the second device utilizing the state information received from the first device.

2. The computer implemented method of claim 1, further comprising:
   responsive to determining that the running application is not presently installed on the second device, receiving the counterpart application.

3. The computer implemented method of claim 2, wherein the step of receiving the counterpart application further comprises:
   responsive to determining that the running application is not presently installed on the second device, receiving the counterpart application, wherein the counterpart application is received from at least one of the group consisting of the first device and an application provider.

4. The computer implemented method of claim 1, wherein the first device is selected from the group consisting of a mobile device, a tablet computer, a laptop computer, a desktop computer, and a television.

5. The computer implemented method of claim 1, wherein the second device is selected from the group consisting of a mobile device, a tablet computer, a laptop computer, a desktop computer, and a television.

* * * * *